Patented Aug. 30, 1927.

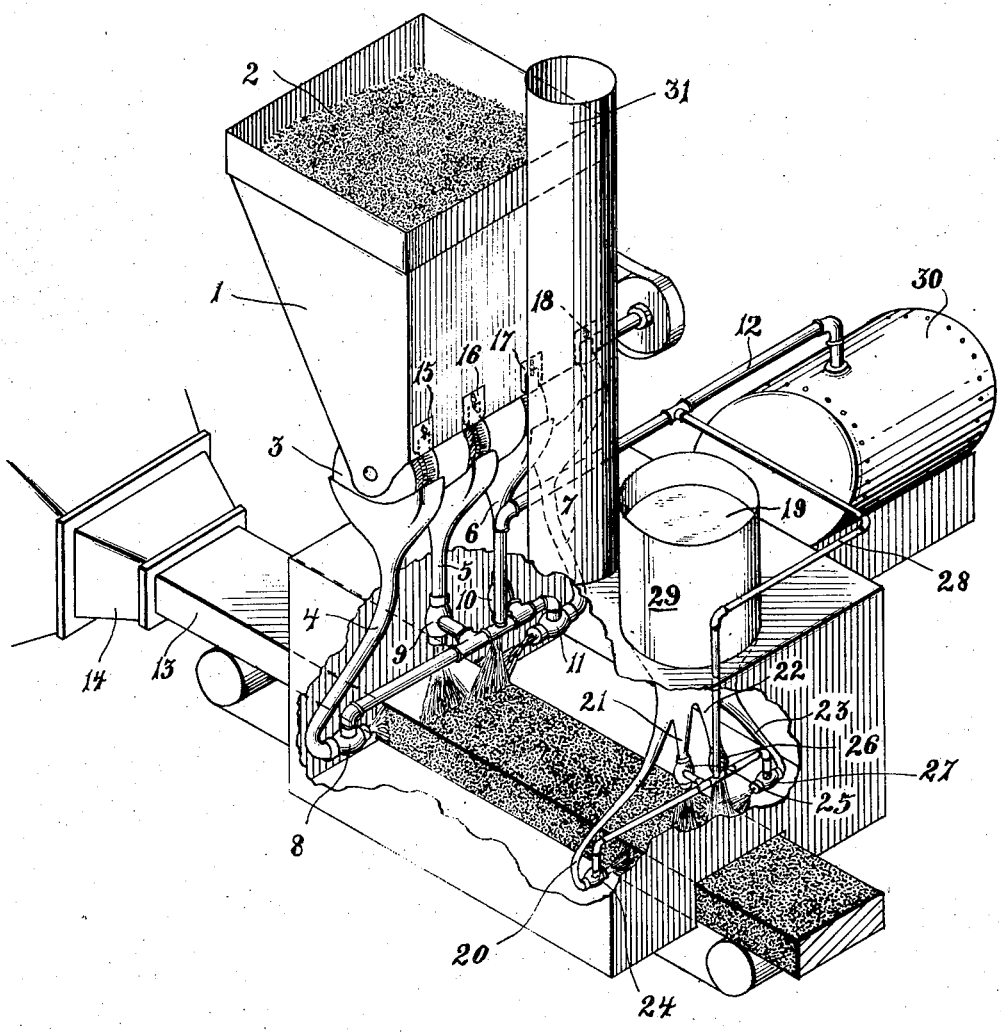

1,641,049

UNITED STATES PATENT OFFICE.

EMMETT V. POSTON, OF SPRINGFIELD, ILLINOIS.

PROCESS OF VENEERING BRICK.

Application filed December 27, 1926. Serial No. 157,288.

This invention relates to the process of veneering brick which includes the controllable movement of variable quantities of powdered and granular particles of dry material from the source of supply thereof, through a plurality of distributing tubes and forcefully blown from a steam jet operatively connected with the end of the tubes and after becoming moistened in the steam line, embedded with variable force into the sides and top surface of a plastic clay column as the column moves out of the die and subsequently spraying the veneered surface of the clay column with coloring pigments and has for its object to render the process of veneering brick more expeditious, more simple and practical and decidedly more economically in connection with the manufacture of brick.

In order to obtain practical and desirable results in the process of veneering brick it is first of all necessary that the materials forming the veneer be substantially embedded in the desired surfaces of the base clay of the column. This had been hitherto attempted by pressing into the sides and top surface of the clay column, slabs of clay of suitable quality as the clay column moved through the die; thus forcing the veneer clay into the desired surfaces thereof after which the clay column moved out of the die and had to be mechanically textured in order to look suitable for face brick; all of which consituted an expensive, not to say, comparatively clumsy and awkward process of manufacture.

It is true that hitherto other methods have been tried which were adapted to successfully veneer brick and it is not surprising that numerous attempts should have been made to achieve a successful process of veneering brick, for the reason that when accomplished in a practical way, it will be most certain to revolutionize the brick-making industry.

By the process of my invention, I employ a method and means whereby materials of varied degrees of coarseness may be moistened and forcefully projected into the sides and top surface of the plastic clay column as the column moves out of the die. By this method and means, the veneering process may be accomplished in a very successful and economical manner. The finished product resulting from this process is a practical, attractively textured, and successfully colored veneered brick. Thus by my process, I make it possible to use any practical quality of building brick clay, as base clay, and substantially project thereon a veneer face composed of face brick clay of practical and suitable quality.

As a result of this material saving in the various grades of face brick clay by the methods and means with which the veneer clay is projected into the clay column, a substantial saving is possible not only in the quantity of high grade face brick clay used but in fact my process makes possible the successful coloring of the veneered surfaces of the clay column with the use of such small quantities of coloring pigments that, it is found to be practical and economical to use almost any one of the numerous better grades of better coloring pigments adapted to use for this purpose in securing the most desirable coloring effects on brick textures.

I attain the objects of my process in a manner and with a machine which will hereinafter be described. The machine hereinafter mentioned however is the subject of a separate and distinct application for patent protection and will not be claimed in this application and the simplified illustrations of which are shown in the drawings submitted herewith are intended only to aid in the disclosure of this process.

Referring to the figures in the drawings:

Figure 1 is a perspective of the machine in its simplest form when normally operating showing how the veneer materials are projected into the clay column and how the column is subsequently sprayed with coloring pigments before being cut up into the building bricks and dried in the kiln.

Referring in detail to the drawings for the purpose of explaining my process of veneering brick, it will be observed that like numerals indicate like parts in the figures and only essential relevant parts of the machine will be illustrated in the drawings.

I employ a hopper —1— to hold the supply of powdered and granular particles of face brick clay —2— and have connected with this hopper a distributing unit —3— for the controllable distribution through pipes —4—, —5—, —6— and —7— of the clay particles. To the outlet end of each of these pipes is operatively connected a steam jet —8—, —9—, —10— and —11—, each connected with a common source of steam supply —12—.

The structural details of the steam jet operating in this process is the subject of a separate patent application and will not be described in detail or claimed in this application.

The plastic clay column —13— is illustrated in the drawing and shown to be moving out of a die —14— from which it comes only as a base clay in plastic form.

In order to make the veneer materials become suitably embedded in the surfaces of the plastic clay column —13—, it is necessary to have them moistened so that they will adhere to the face of the plastic base clay; but in order to secure the desired distribution results with this process, it is best to handle the veneer clay particles dry throughout their movement through the veneering machine; thus making it possible to avoid congestion of the material in the pipes through which the materials are moved.

My process therefore is as follows:

I turn on the steam into the steam pipe —12— causing steam to escape from jets —8—, —9—, —10— and —11— with a desirable force of approximately 40 pounds to the square inch and at the same time release a desirable quantity of veneer materials from hopper —1— through the gates —15—, —16—, —17— and —18— of the distributor —3—; thus permitting the materials to be forcefully sucked in their dry form down through pipes —4—, —5—, —6— and —7— to and through steam jets —8—, —9—, —10— and —11— where they are thrown into contact with the escaping steam and moistened and projected forcefully into the sides and top face of the plastic clay column to which they adhere so substantially and successfully that the veneer materials and base clay thereby form a perfectly homogeneous mass, impossible of separation by any known means.

After thus projecting the veneer materials into the sides and top face of the plastic clay column with a variable force and in variable quantities, a variety of most natural and attractive veneer textures are made possible without further mechanical contact with the veneered surfaces of the column.

The veneered faces of the column are then sprayed with a solution of the desired mixture of coloring pigments —19— shown in tank —29— as the column moves on to be cut up into building bricks and then kiln dried for use.

It will be observed in Figure 1 that I provide in connection with tank —29— for the coloring pigments, tubes —20—, —21—, —22—, and —23— for carrying the pigments either in liquid or dry powdered form down to the jets —24—, —25—, —26— and —27— from which the pigments are blown onto the sides and top faces of the plastic clay column after the same have been veneered in which condition it is found that these surfaces will most successfully absorb and retain the coloring pigments.

Attached to the jets that are used for the discharge of coloring pigments are steam pipes connected with steam lead pipe —28— which is in turn connected with boiler —30—.

It will be noted in Figure 1 that a pipe —31— is provided for carrying away steam or dust and the like that may otherwise accumulate in the atmosphere about the clay column and cause discomfortures and inconveniences among the workers.

It may be remarked that by varying the quantity of flow of the veneer particles from the source of supply that the veneer surfaces on the clay column may be varied in thickness, and by varying the size of the veneer materials, the degree of coarseness of the veneer texture may be varied and by varying the amount of steam pressure within practical limits, the depth to which the veneer surfaces may be embedded in the base clay column may be varied; and it may be further remarked that it would be practical to mix the coloring pigments with the veneer materials while they are in their dry state but the method above mentioned which includes the spraying of the veneered surfaces is a preferred method which is found to be most economical and practical since in my process of veneering the brick, I leave the veneered surface untouched by any further mechanical texturing apparatus and thus leave these natural untouched surfaces in the most favorable condition for absorbing and retaining the penetrating coloring pigments because of the fact that all the veneer surface materials are porous, permeable and spongy and have never been compressed by movement through the die or under other mechanical pressures.

It will be evident to those skilled in the manufacture of brick that my process will operate to successfully veneer fire brick with super-refractory materials of a substantial thickness that will be practical to use under any known firing conditions.

I claim:

1. The process of veneering brick consisting in moving a plastic clay column out of a die and moving powdered and granular particles of dry clay out of a hopper through a plurality of distributing tubes, from which said dry clay particles are forcefully ejected by steam jets, and moistened and projected onto the plastic side and top surfaces of said clay column; and subsequently spraying said surfaces of the column with coloring pigments.

2. A process of ornamenting a plastic column consisting in forcibly projecting and embedding dry granular materials into the surface of the column and in subsequently treating the embedded material with coloring chemicals.

3. The process of ornamenting a plastic column consisting in forcibly blowing with steam granular materials into the surface of the body and then treating the surface with coloring chemicals.

4. The process of texturing a plastic clay column consisting in moving dry granular materials to points near the plastic column, then simultaneously moistening and projecting the granular material into said plastic column and subsequently treating said column with coloring chemicals.

5. The process of veneering brick consisting in moving the plastic clay column and simultaneously moistening and projecting dry granular clay particles into the plastic column surfaces and treating said surfaces with coloring chemicals.

6. The process of veneering brick consisting in relatively moving a plastic column and controllably releasing variable quantities of powdered and granular materials from a container through distributors to and through fluid jets from which said materials are forcefully projected by and moistened in a fluid stream and forcefully projected into the surfaces of said relatively moving plastic column; and subsequently spraying said surfaces of said relatively moving plastic column with penetrating color chemicals; whereby said column may be veneered with granular materials of varied degrees of coarseness, varied kinds and qualities of materials and any desirable color.

In witness whereof, I hereunto set my hand this 18th day of December, A. D. 1926.

EMMETT V. POSTON.